Figure 8:
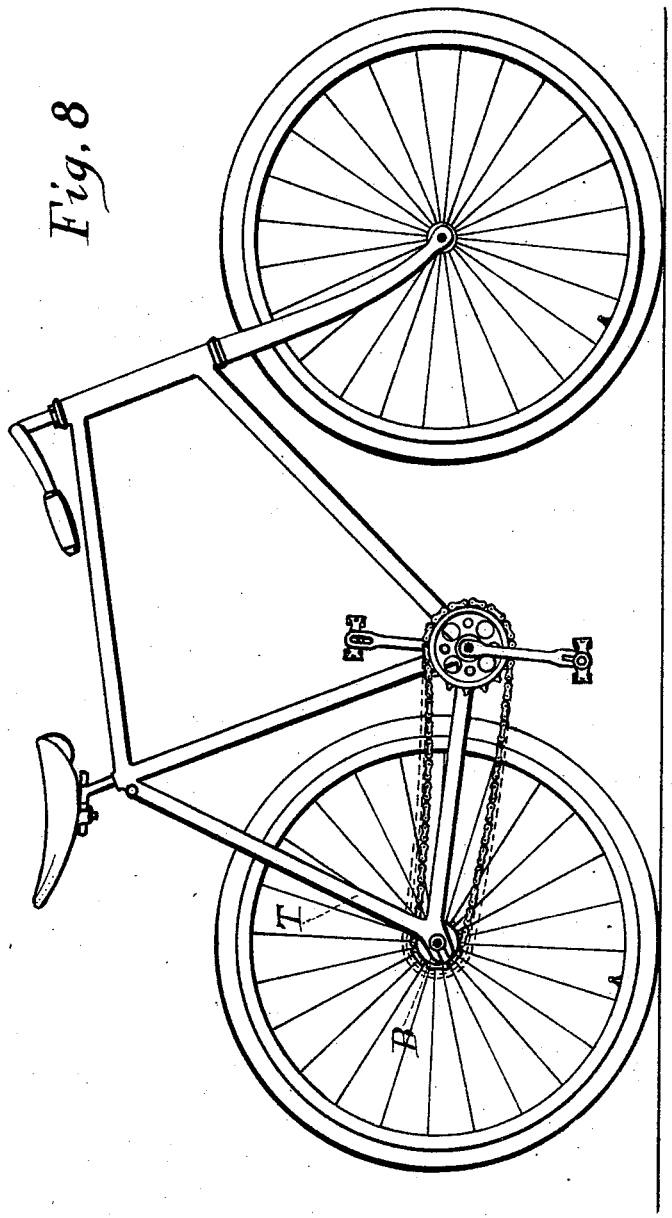

(No Model.) 2 Sheets—Sheet 1.
A. M. SNYDER.
INTERCHANGEABLE SPROCKET.
No. 529,843. Patented Nov. 27, 1894.
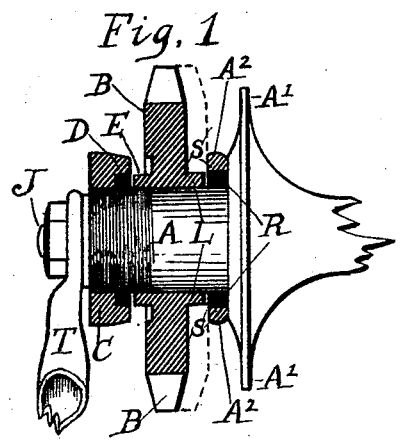
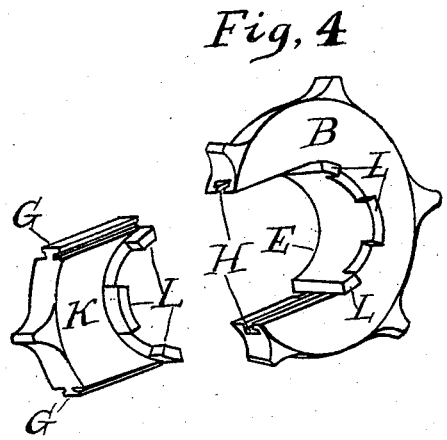
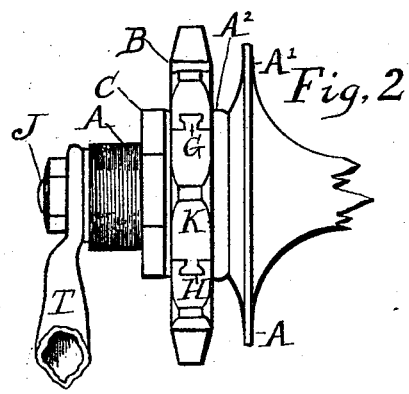
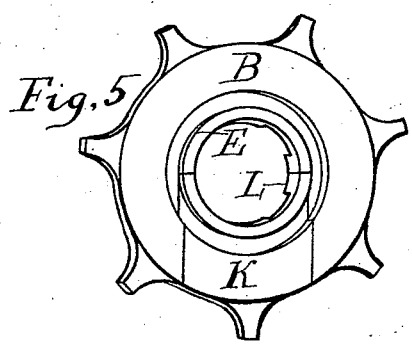
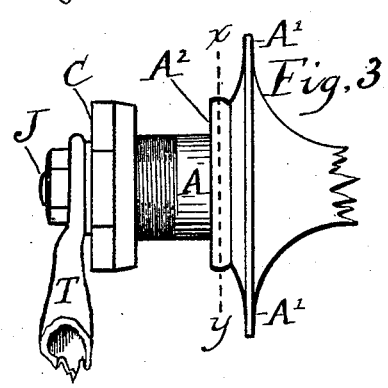
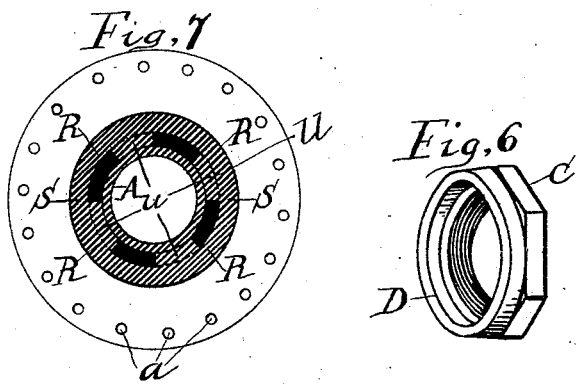
Witnesses.
Chas. H. Gage
Wm Louden
Inventor.
Arthur M Snyder
THE NORRIS PETERS CO., PHOTO-LITHO., WASHINGTON, D. C.

(No Model.) 2 Sheets—Sheet 2.

A. M. SNYDER.
INTERCHANGEABLE SPROCKET.

No. 529,843. Patented Nov. 27, 1894.

Witnesses.
Chas H. Gage
Wm Louden

Inventor.
Arthur M Snyder

UNITED STATES PATENT OFFICE.

ARTHUR M. SNYDER, OF FAIRFIELD, IOWA.

INTERCHANGEABLE SPROCKET.

SPECIFICATION forming part of Letters Patent No. 529,843, dated November 27, 1894.

Application filed December 29, 1893. Serial No. 495,152. (No model.)

*To all whom it may concern:*

Be it known that I, ARTHUR M. SNYDER, a citizen of the United States, residing at Fairfield, in the county of Jefferson and State of Iowa, have invented a new and useful Improvement in Interchangeable Sprockets, of which the following is a specification.

My invention relates to interchangeable sprocket wheels for bicycles, or other vehicles propelled by a driving wheel, and it consists of a sprocket wheel constructed of two separable parts fitted together and adapted to fit on the hub of a driving wheel and to catch against a shoulder or offset thereon, so that the separable parts of the sprocket will be held together, and the driving wheel will be rotated by a chain passing over the sprocket in the usual manner, and so arranged and held in position that the sprocket may be removed from the hub without detaching any of the parts except the two of which it is composed; also in details of construction hereinafter set forth.

The object of the invention is to construct sprocket wheels for bicycles, or other vehicles having a driving wheel, that will be readily interchangeable so that wheels of different diameters and having different numbers of teeth may be easily adjusted upon the hub of the driving wheel so as to regulate at will the speed and power of the wheel. As interchangeable sprocket wheels have been heretofore constructed, they have to be taken off or put on over the end of the hub, thus requiring considerable time and trouble to disconnect the hub from the frame of the machine to make the exchange; also, in removing the sprocket, the parts connecting it to the hub have to be detached and are liable to get lost. I overcome all this by means of the mechanism herein described, reference being had to accompanying drawings, in which—

Figure 1 is a side view of the outer end of the hub of a bicycle driving wheel, showing a sectional view of the sprocket wheels and its connections, the sprocket wheel being in the position of being attached to or detached from the hub. Fig. 2 is a side view of the same, the sprocket being in working position with its clamping collar screwed up against it. Fig. 3 is a side view of the same showing the sprocket removed. Fig. 4 is a perspective of the sprocket showing the separa-
ble section withdrawn to place the sprocket on the hub or remove it therefrom. Fig. 5 is a side view of the outer side of the sprocket showing the separable section in position. Fig. 6 is a perspective of the cupped and threaded collar which holds the sprocket in place. Fig. 7 is a cross section view of the hub drawn upon the dotted lines $x$, $y$ of Fig. 3. Fig. 8 is a side elevation of a bicycle suitable for the application of my invention, and it shows by the dotted lines the substitution of a larger for a small sprocket wheel.

A represents a portion of the hub of a driving wheel to which the sprocket is applied and A' the part to which the spokes of the wheel may be secured. The sprocket wheel B is bored to fit over the part A of the hub and to slide against a collar or shoulder $A^2$, forming a portion of the hub or rigidly secured thereto. In this collar or shoulder recesses R are formed and on the inner side of the sprocket are lugs L which fit into the recesses R to hold the sprocket in engagement with the hub. The portion A of the hub is threaded and receives a threaded collar C. This collar is made cup shaped and has a tapering annular lip D which fits over an annular flange E on the outer side of the sprocket which is also made slightly tapering. When the lugs L of the sprocket are in the recesses R and the cap C is screwed up against the sprocket, it will be rigidly secured to the hub as shown in Fig. 2, so that the wheel may be driven by a chain passing around the sprocket B, as shown in Fig. 8.

To make the sprocket interchangeable I construct it with a separable section K which may be withdrawn to remove it from the hub or to replace it thereon. To do this the collar C is screwed back on the hub A and the sprocket B is slid out so the lugs L will be out of the recesses R and the annular flange E free from the lip D on the collar C, as shown in Fig. 1. When in this position the section K which is as wide as the diameter of the part A of the hub of the driving wheel, can be withdrawn, as shown in Fig. 4, and the sprocket removed from the hub and replaced by another sprocket in the manner already described. It will be seen that no bolts, screws, or keys are required to hold the sprocket or the parts comprising it in place. The annular flange E and the lugs L being on the separable section K, as well as on the remainder of the sprocket, the latter are held in the recesses R under the rim S of the shoulder A², and the former is caught under the lip D of the collar C, and the section K is held securely in position without the use of any extraneous fastenings. The only loose pieces to be handled in removing or replacing the sprocket are the two parts comprising the sprocket itself, and the only thing necessary to be done in removing or replacing the sprocket is the screwing back or forth of the cap C, which may be done without disturbing the adjacent frame T. The lip D of the collar C catching over the flanges E of the separable parts of the sprocket will be sufficient to hold the parts together without the rim S to catch over the lugs L when they are slipped into the recesses R, and the parts U (see Fig. 7) of the shoulder A will hold the sprocket rigidly in engagement with the hub. On the other hand the shoulder A² constructed with the recesses R, the portions U between the recesses, and the rim S outside of said recesses, in connection with the lugs L on the separable parts of the sprocket, will be sufficient to hold the sprocket rigidly in engagement with the hub, and also from coming apart, if the flange E and lip D were discarded and a straight faced collar or other suitable means were used to hold the sprocket in engagement with the shoulder A². It is preferable however, that means should be used on both the collar C, and the shoulder A² to hold the separable parts of the sprocket together, although either alone would answer the purpose, and the means used may be modified without departing from the spirit of my invention. The section K occupies the same plane as the remainder of the sprocket and is removable in this plane, and therefore, requires the very least possible space to make the change, being only the space occupied by the widest part of the sprocket itself in the length of the hub.

To strengthen the sprocket I cut dovetails G on the opposite edges of the section K which fit into corresponding grooves H cut in the adjoining parts of the sprocket. By cutting these dovetails from the center out to the periphery of the sprocket it is made much stronger than if they were cut crosswise through the plane of the wheel, and the section K can be removed or replaced in less space than if it had to be slipped in and out at one side. The hub A may be otherwise constructed in any manner preferred without interfering with the applicability of my invention. In the drawings I have shown the part A' with perforations a, for the attachment of the spokes of the driving wheel in the ordinary manner; also the hub may be made tubular for the reception of suitable bearings and also for the passage of the bolts J commonly used to connect the hub to the bicycle frame T. I do not however, limit the applicability of my invention to this particular kind of hub.

Having thus described my invention, what I claim as new, and desire to secure by Letters Patent, is—

1. The combination with a driving wheel having a hub with a shoulder thereon, of a sprocket wheel constructed of two separable parts adapted to fit over said hub and catch against said shoulder, and a collar to hold the parts of the sprocket together and in rigid engagement with the hub, substantially as and for the purpose set forth.

2. The combination with a driving wheel having a hub with a shoulder thereon, of a sprocket wheel constructed of two separable parts adapted to fit over said hub and having means adapted to catch under said shoulder, and a collar adapted to screw on said hub and hold the sprocket in rigid engagement with the shoulder thereon, substantially as set forth.

3. The combination with a driving wheel having a hub with a shoulder thereon, of a sprocket wheel constructed of two separable parts adapted to fit over said hub and catch against said shoulder, and a collar adapted to screw on said hub and hold the sprocket in rigid engagement with the shoulder thereon, the sprocket being fitted with a flange on the side adjoining the collar, and the collar being provided with an annular lip to catch over said flange.

4. The combination with a driving wheel having a hub with a shoulder thereon, of a collar adapted to screw on said hub, and a sprocket wheel constructed of two separable parts, adapted to fit over said hub between said shoulder and collar, and to be removed from said hub by the separation of the parts, composing the sprocket in the same plane occupied by the sprocket itself.

5. The combination with a driving wheel having a hub with a recessed shoulder, of a sprocket wheel constructed of two separable parts adapted to fit over said hub and having lugs on the parts adapted to enter the recess in the shoulder of the hub, and a collar adapted to screw on the hub and hold the sprocket in engagement with the shoulder of the hub.

6. The combination of a driving wheel having a hub with a shoulder thereon and recesses in said shoulder, a cup shaped collar adapted to screw on said hub, and a sprocket wheel composed of separable parts adapted to fit over said hub between said shoulder and collar, said sprocket having on one side lugs adapted to fit into the recesses in the shoulder of the hub, and on the other side an annular flange or lip, the cupped shaped collar being adapted to fit over the said annular flange and hold the parts of the sprocket wheel together and in engagement with the hub, substantially as shown and described.

ARTHUR M. SNYDER.

Witnesses:
BERT GILLETT,
FRANK ZIMMERMAN.